United States Patent Office 3,259,824
Patented July 5, 1966

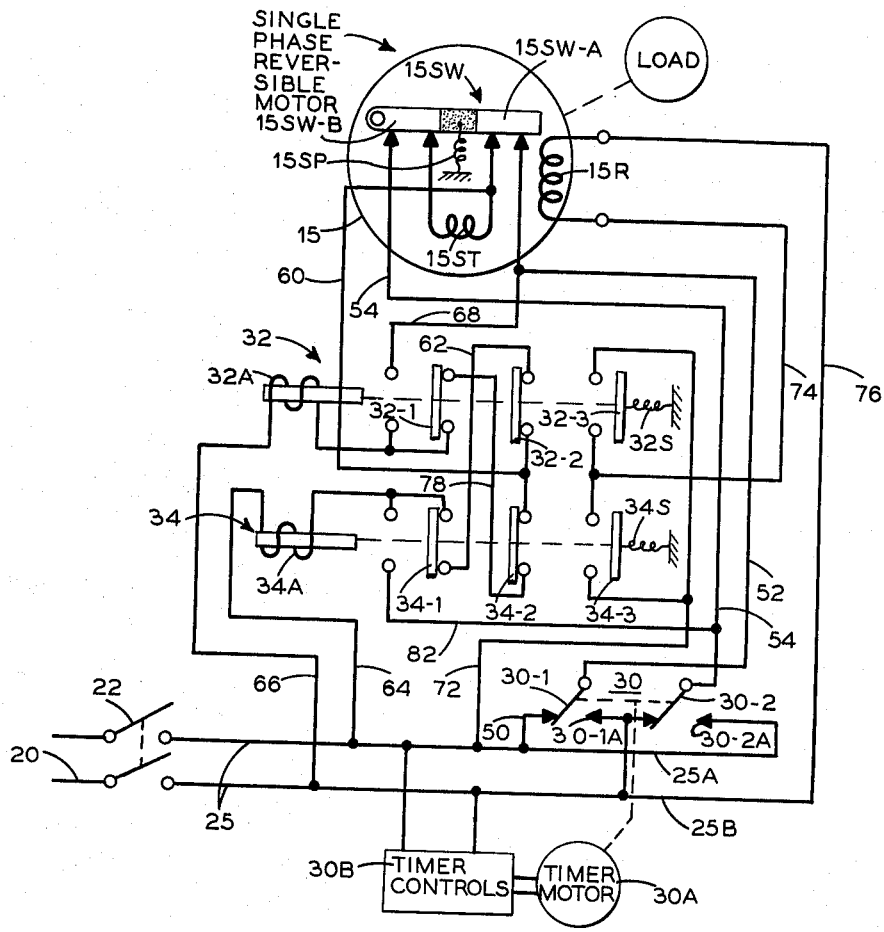

3,259,824
SINGLE PHASE MOTOR REVERSING SYSTEMS
Harry Greenwald, Whitestone, N.Y., assignor of one-third each to Louis Wolff and Harry Silberglait, Brooklyn, N.Y.
Filed May 10, 1963, Ser. No. 279,451
5 Claims. (Cl. 318—207)

This invention relates to reversing systems for single phase motors.

There are some applications where the use of a single phase motor is dictated because only single phase power circuits are available. For example, in the operation of home-type washing machines, usually only a single phase line is available in the home. For certain washing operations, it is desired that the motor rotation be periodically reversed. Also in certain types of machine operations, as in lathes, such reversal is desired.

A single phase motor is generally capable of rotating in either direction. The motor is provided with two windings, one a running winding and the other a starting winding. The starting winding can be energized in either direction to control the direction of rotation of the motor during starting. Thereafter, the starting winding can be disconnected and the motor will continue to operate in the same direction it started under the influence and control of the regular running winding.

The conventional practice is to energize the starting winding until the motor speed is brought up to the operating speed of the motor. A centrifugal switch is provided and arranged to be operated by the rotating part of the motor when the motor speed reaches a predetermined operating speed. Normally, the centrifugal switch is closed and serves to connect the motor starting winding to one terminal of the voltage supply that is to energize the motor windings. When such operating speed is reached, the centrifugal switch opens and opens the circuit of the starting winding since that starting winding has already accomplished its purpose in starting the motor in the appropriate direction as desired. Thereafter, only the running winding remains energized so long as the motor operation is desired.

When the direction of rotation of the motor is to be reversed, for the purpose of the operation that is desired, the motor must be de-energized in order to permit the rotor to reduce its speed to a low speed near zero speed, at which the motor may be safely energized in a reverse direction, so its direction of rotation will be reversed. For convenience, reference to zero speed will include a reduced or low speed at which reversal of motor connections may be safely made, without damage to the motor windings or resulting excessive circuit currents.

When the motor is operating it is connected to a load that may be of any amount within the load capacity for which the motor is intended and capable of assuming. Thus, the load on the motor may vary from a small amount to a maximum amount sufficient to tax the full power capacity of the motor. The size or amount of the load connected to the motor will determine the inertia of the load connected to the motor. Thus, the inertia of the motor and its connected load may vary from the inertia of the motor plus a small load to a value including the inertia of the motor and a large load.

When the motor is thus operating with its load, the total inertia will determine the amount of time required by the motor and its load to come back down to a safe low speed, so that the motor may be safely energized to rotate in the opposite direction.

In order to allow sufficient time for the motor and its load to come to rest, conventional practice assumes that the load attached to the motor is the maximum that the motor can tolerate and take care of, and then provides for a time interval corresponding to the time that would be necessary for such a load connected to the motor to come to rest.

Therefore, a suitable timing device is adjusted to a time interval corresponding to such time that would be necessary for the motor and its maximum connected load to come to rest. Thus, according to conventional practice, when each reversing operation is to be initiated, this preset time interval is utilized to determine when it will be safe to connect the motor to the circuit in a manner to cause reverse rotation.

Obviously, such time interval presents the longest time interval that may ever be necessary to permit the motor and its connected load to come to rest. Also, in order to provide a safety factor, such preselected time interval must be somewhat longer than the actual time interval that will be required by the motor and its connected load to come to rest.

The load connected to the motor and driven by it in any one direction will not always be the maximum load which the motor can handle. During many operations, the load may be considerably less than the maximum load which may be imposed upon the motor. Consequently, the actual time for the motor and its connected load to come to rest will be less than the arbitrary time interval adjustably predetermined according to conventional practice. Consequently, the motor will be kept at rest with the connected load during many unnecessary rest intervals, merely because the arbitrary time setting for a maximum load condition will be much greater than the actual time required for the load as then actually connected to the motor.

The object of the present invention is to provide a reversing system for such a single phase motor which will directly detect the time required for the motor and its connected load to come to rest, and thereupon operate immediately to establish the reversing operation of the motor.

Another object of the invention is to utilize an operating condition of the motor itself as a control for determining the correct time for establishing the circuit-reversing operations to reverse the direction of operation of the motor.

Another object of the invention is to utilize the standard conventional switch that is built into every single phase motor with a starting winding, and to utilize such centrifugal switch as a detector of the low speed or rest-condition of the motor, and as a control for the external switching equipment that establishes a reverse connection to the windings to cause a reversal of rotation of the motor.

In accordance with the principle of the present invention, the usual centrifugal starting switch is utilized, and, depending upon the circuitry employed, may be provided with an extra contact for controlling external relay switches, as well as the starting winding. The basic contact of the centrifugal starting switch is left in its usual operating condition which serves to open the circuit of the starting winding when the motor reaches operating speed. The centrifugal switch then stays open until the motor speed drops to near zero before the motor actually comes to rest.

In my co-pending application Serial No. 239,529 filed November 23, 1962, entitled Single Phase Motor Reversing Systems, now abandoned the system disclosed therein employs a single relay in co-operation with the centrifugal switch of the single phase motor for controlling the circuitry switching for reversing the motor operation.

So long as that single relay is in proper operating condition, and performs the operations required of it in the system, the system will function properly as intended.

Under normal operating conditions, the operation of a reversing switch, or of any other device that is to initiate a reversing operation, will de-energize the relay that establishes the running circuitry condition. Such relay will then open the running circuit to permit the motor to decelerate and close the speed-responsive centrifugal switch to indicate conditions are safe for reversal.

In the case of a washing machine, for example, a sequence of controls is preset for the reversing operations. If the relay should fail to go out at the proper time, for one operation, and remain in operated position, the subsequent reversing operation, if it then causes the relay to go out, would merely delay the entire sequence of operations.

However, in the case of a different kind of machine, such as a machine tool, for example, it is desirable to provide a safety factor by controlling the operation in each direction by its own relay. Thus, each relay would control operation of the motor in each specific direction.

A feature of this invention is the circuitry arrangement for energizing the relay that controls the operation in the desired direction of rotation, and for short-circuiting the other relay, thereby to assure only the desired operation.

The purpose of the present application is therefore to provide an extra factor of safety that will definitely assure the reversing operation corresponding to each specific command. For that purpose, one relay is employed to control the forward direction of rotation of the motor and a second relay to control the reverse direction of rotation of the motor. Thus, each relay will control the direction of rotation of the motor for which the relay circuitry has been predetermined.

One of the features of the invention is the provision of energizing circuitry for the two relays so that the operation of the relays and of the system is independent of any time relationship between the operation of the relay and the operation of the centrifugal switch of the motor. An additional feature of the circuitry by means of which such independence of time relationship between either relay and the centrifugal switch is achieved is the arrangement of the circuitry to provide an energizing circuit for only that relay which is to operate according to the direction of the motor as desired, while the other relay, which is not to have any control function on the motor at that time, is short-circuited so that it cannot move to normally closed or operating position.

In the present invention, the position of the centrifugal switch is employed to determine whether conditions are proper for operation of either relay, according to direction of rotation being commanded by the timer switch. The selected relay thereupon operates to lock itself in closed position until a reversing operation is desired.

In usual practice, the motor is controlled by a suitable external reversing switch to cause the motor to operate in forward direction or in reverse direction in a predetermined sequence, according to the operation to be performed by the motor.

In accordance with the present invention, one feature is to arrange for the disconnection of the windings and the opening of the operated relay switch when the external reversing switch is operated.

Then both relay switches remain open until the centrifugal switch of the motor recloses to indicate proper condition for energizing the motor windings for operation in the reverse direction. The second relay switch is therefore operated.

Ordinarily, only the starting winding must be disconnected during the switching operation. In accordance with the precautionary features of the present invention, provision is also made to similarly disconnect the running winding during the switching operations when the polarity of the circuitry is reversed.

In accordance with the present invention, two modifications are shown for establishing motor reversing circuitry for a single phase motor.

In one modification, a double centrifugal switch on the motor is utilized to isolate both terminals of the starting winding from the energizing power circuit. In the second modification, one of the relay switch contacts is utilized to isolate one terminal of the starting winding from its supply circuit, and the centrifugal switch is utilized to isolate the other terminal of the starting winding from the power supply circuit. Switch contacts controlled by the respective relays also are utilized to connect the running winding to the power circuit in proper polarity, which is generally fixed, so that only the relative polarity of the starting winding is reversed.

The manner in which the control circuitry for the motor and its windings is arranged in both modifications is described in the following specification, taken in connection with the accompanying drawing which is a simple schematic diagram of the circuitry and switching equipment for controlling the direction of rotation of a single phase motor, utilizing a double centrifugal switch for controlling both the starting winding and a control circuit for two direction-controlling relays.

As shown in the drawing, a reversing system for a single phase motor 15 includes a power supply 20 from which energy is supplied through a main switch 22 to a local bus line circuit 25, from which energy is to be supplied to the motor 15 through a main reversing switch 30, in co-operation with two control relays 32 and 34 for controlling the excitation of the running winding 15R and of the starting winding 15St of the motor 15.

In order that the description of the circuitry may proceed smoothly, certain elements of the several components including the motor, the reversing switch and the control relay will be first identified.

The motor 15 comprises the main winding 15R and the starting winding 15St previously referred to. In addition, the single phase motor 15 includes a conventional centrifugal starting switch 15Sw which is spring-restrained to close two switch circuits in the rest position of the motor, and to open those circuits when the motor reaches a certain predetermined operating speed. The switch represented by 15Sw is the conventional switch built into a standard single phase motor to control the starting winding by opening such starting winding after the motor attains a certain operating speed, and to reclose that winding when the motor comes back substantially to rest. The starting switch is shown as a double switch with separate elements 15Sw-A and 15Sw-B.

In the rest position when the motor is stationary, such standard centrifugal switch contacts are closed so that the starting winding circuit is then closed within the motor.

The relay 32 serves to control the running motor winding and comprises a stationary operating coil 32A which operates in conventional fashion to move a core and switch assembly against the restraining force of a biasing spring that normally holds the core and the switch assembly in back position with its switches in the positions shown. As here shown, the relay comprises three switch elements 32–1, 32–2 and 32–3.

The relay 34 also serves to control the running winding and similarly comprises an operating coil 34A and three switches 34–1, 34–2 and 34–3.

The reversing switch 30 is arranged to be operated to either switching position through a suitable motive device, which may be a motor operating through suitable gear reducing means, or it may be a suitable electromagnetic actuating assembly, but is here shown for simplicity as consisting of a motor 30A.

The reversing switch 30 is controlled by the timer motor 30A, and is shown in the forward energizing position for the main motor 15. The timer motor is usually predesigned to fit the washing machine that is to be operated by the main motor 15, and the timing sequences for controlling the reversing switch are already worked out and constitute part of the control system 30B shown associated with the timer motor 30A.

In the case of a washing machine, for example, which is to be operated by the main motor 15 the timer controls associated with the timer motor will operate the reversing switch 30 according to some specific program of the operations to cause the main motor 15 to be operated for specific time intervals in a forward direction and for other specific time intervals in a reverse direction. Those details are not part of the present invention and are merely referred to to explain some of the characteristic background of the application to which the present system may be applied.

When a reversing operation of the main motor 15 is to be established, the timer motor will be operated to move the reversing switch 30 to its other position, at which the switch blades 30–1 and 30–2 will engage their associated right-hand contacts 30–1A and 30–2A.

It will be observed that this operation of the reversing switch will serve to reverse the connections of the respective switch blades 30–1 and 30–2 to the opposite conductors of the bus power supply circuit 25. In this system, only the starting winding 15St is connected to the supply circuit through such reversing switch 30, so that the connections to energize the starting winding are thus relatively reversed in polarity by the reversing switch, relative to the excitation of the running winding 15R. The running winding 15R is arranged to be connected always to the supply conductors 25 in the same manner through each of the two relays 32 and 34.

This change in connection of the starting winding relative to the running winding, establishes the starting of the motor 15 in one direction or the other, depending upon the direction of excitation of the starting winding relative to the excitation of the running winding 15R.

The operation of the system will be explained first for the position of the reversing switch 30 as shown, which may be taken as corresponding to the forward position of the main motor 15.

Assuming that the entire system is at rest, all of the elements and components of the system will be in the positions shown in the drawing.

When the system is to be placed in operation, the main power switch 22 is closed, which thereupon puts voltage from the main supply circuit 20 onto the bus system 25. Energy will thereupon be supplied to the starting winding 15St of the motor 15 and to upper relay 32.

The circuit to the starting winding may be traced from upper bus 25A through conductor 50, switch blade 30–1, conductor 52, centrifugal switch contact 15Sw–A, the starting winding 15St, the other centrifugal switch contact 15Sw–B, conductor 54 and down through switch blade 30–2 to the other bus conductor 25B. The starting winding 15St is thereupon energized and determines the direction of rotation which the rotor of the motor 15 will assume as soon as the running winding 15R is energized.

The running winding 15R will be energized immediately upon closure of the relay switch 32–3 of the upper relay 32. The relay 32 is energized simultaneouly with the starting winding 15St. The energizing circuit for the relay 32 starts at bus conductor 25A, conductor 50, switch blade 30–1, conductor 52, centrifugal switch 15Sw–A, conductor 60, to the terminals of the two relay switches 32–2 and 34–2, and from there through two branches. The first branch from the top of relay switch 32–2 goes through conductor 62, back position of relay contact 34–1 to relay coil 34 and through conductor 64 back to bus 25A. Since the circuit including this branch started from conductor 25A and completed a closed circuit back to conductor 25A, the circuit including this branch constitutes a short circuit on the operating coil 34–A of relay 34, and keeps that relay coil de-energized so that it cannot operate its switch contacts.

That is one of the features of this invention which puts a definite preventive blocking action on the relay 34 when its operation is not desired.

The second branch of the circuit from the conductor 60 through the lower relay switch 34–2 may now be traced up conductor 78 through the back position switch 32–1 of the relay 32 and then through the operating coil 32A and conductor 66 down to the lower bus conductor 25B. The circuit through this branch including the coil of relay 32 started from the upper bus conductor 25A and ended on the lower bus conductor 25B, thereby putting full operating voltage on the relay coil 32A and thereby energizing the relay 32 and causing it to operate to its forward operated position against the force of the return biasing spring 32S.

Upon operation of the relay 32, its switch 32–1 moves to its forward closed position to complete a circuit from the associated end of the relay coil 32A through a conductor 68 to the conductor 52 which proceeds down to the bus conductor 25A. This circuit serves as a lock-in circuit for the relay 32. At the same time, upon operation of relay 32 its two switches 32–2 and 32–3 are operated. The switch 32–2 opens the circuit to the coil 34–A of relay 34, thereby further placing a positive block to prevent energization of that relay 34. The closure of the third switch of relay 32, namely switch 32–3, connects the running winding of the motor 15R to the energizing circuit 25 through a circuit that may be traced from conductor 25A of the power supply bus through conductor 72 through switch 32–3 and then through conductor 74 to the running winding 15R and thence through conductor 76 down to the lower bus 25B of the supply power circuit. The running winding 15R is thereupon energized.

The two windings of the motor are now energized and the motor starts to rotate in the direction controlled by the direction of energization of the starting winding 15St.

The main motor 15 continues to drive the load in that direction until the reversing operation is called for by the timer controls 30B associated with the timer motor 30A and the reversing switch 30. At that instant, the reversing switch 30 is operated to engage the right-hand terminals by the switch blades 30–1 and 30–2. This operation of the reversing switch connects the switch blades to the conductors of opposite polarity. Consequently, conductor 52 which was previously connected through blade 30–1 to the upper power bus 25A is now connected to the lower bus 25. Similarly, the other conductor 54 which was connected to the lower bus 25B is now connected to the upper bus 25A. The polarity of the connections to the starting winding 15St will now be reversed as soon as the centrifugal switch 15Sw is permitted to come to its rest position by the deceleration of the motor 15.

At the same time, the circuitry of relay 32 will be controlled to cause the de-energization and opening of that relay 32.

Thus, for example, the opening of the circuit at the switch blades 30–1 and 30–2 to the conductors 52 and 54 will also open the circuit in the conductor 52 to the relay coil 32A through its own front contact switch 32–1 and conductor 68.

At this point occurs again one of the important features of this invention. The conductor 52 is now connected to the lower bus 25B through the switch blade 30–1 engaging the contact 30–1A. Consequently, both terminals of the relay coil 32A are connected to the lower bus 25B, and there is thus a short circuit on the coil of relay 32 which hastens the collapse of any magnetic field associated with the relay 32 so that the relay will tend to open as quickly as its mechanical characteristics will permit, and also holds coil 32A de-energized. The circuit of the running winding 15R is thereupon opened, and the inertia of the motor and the load connected thereto will cause the rotor of the motor 15 to decelerate.

When the speed of the motor 15 decreases to the value at which the centrifugal switch 15Sw may reclose, the starting winding 15St will be re-energized through centrifugal switch 15Sw but in a reversed direction, and the circuit through the conductor 60 from the centrifugal switch 15Sw will be re-established to the two back switches 32–2 and 34–2, and thence through relay switch 32–2 through conductor 62, back position of switch 34–1 and through the operating coil 34–A of relay 34 and thence through conductor 64 to the upper bus conductor 25A. The energizing circuit is thus completed for the relay coil 34–A and relay 34 operates to operate its switches 34–1, 34–2 and 34–3.

The front switch 34–1 completes the circuit from the corresponding end of the relay coil 34–A through conductor 82 to conductor 54 and thence through the switch blade 30–2 to the upper conductor 25A to lock relay 34 in. The part of the circuit to the operating coil 34–A that proceeded from the conductor 60 through the switch 32–2 and the back position of the relay switch 34–1 assured an interlock circuit that showed that the relay 32 was in its de-energized position, as well as relay 34, so that the circuit to the running winding 15R was assuredly open while the motor was decelerating to permit the centrifugal switch 15Sw to reclose.

The energization and operation of the relay 34 served to lock itself in at the front position of its switch 34–1, and to open the interlock circuit at switch 34–2 to the relay coil of relay 32, and to close the switch 34–3 which then closed the circuit to the running winding 15R to energize that winding.

Thus, in each case, the starting winding is energized in a definite selected direction to establish the selected direction of rotation in the motor 15 before or at the time either relay 32 or 34 is operated to close the running winding 15R. Thus, the switching of the starting winding to establish desired energization of the starting winding is always completed before the running winding is energized.

By means of the two middle switches 32–2 and 34–2, an electrical interlock is established between the two relays which requires either relay to be in its de-energized non-operated position before the other relay can be energized and operated.

The other feature of the invention is the provision of the circuitry which causes the reversing switch upon each operation to place a short circuit on the operating coil of the relay which is to be moved back from energized to non-energized position in order to permit the circuitry to be rearranged for the reverse operation with respect to the operation that is just being terminated.

Thus, the invention herein is directed to the apparatus and operations for reversing the direction of rotation of a single phase motor, by detecting a condition indicating that the windings may then be safely connected to an external energizing circuit, and by utilizing two relays respectively provided to assure proper conditions for rotation in a specific direction which each relay controls. The construction of the elements and the arrangement of the circuitry may be modified or transposed without departing from the spirit and scope of the invention as set forth in the claims.

What is claimed is:

1. A reversing system for a single phase motor having a running winding, a starting winding and a speed-responsive switch normally closed below a predetermined motor speed and arranged to open when the motor speed reaches or exceeds said speed, said system comprising
a source of alternating voltage for energizing the two motor windings to cause operation of the motor;
a reversing switch for controlling the direction of energization of the starting winding relative to the direction of energization of the running winding;
a first relay switch having an operating coil and a switch assembly operable thereby for controlling the connection of the running winding to the voltage source when said first relay switch is energized and moved to operated position;
a second relay switch similarly having an operating coil and a switch assembly operable thereby to control the connection of the running winding to the voltage source when said second relay switch is energized and moved to operated position;
and means including said reversing switch for controlling whether said first relay or said second relay shall operate to connect the running winding to said voltage source.

2. A reversing system, as in claim 1, in which
said relay-controlling means include means for short-circuiting the operating coil of either relay when in operated position at the time the reversing switch is operated to assure the return of said operated relay to non-operated position with consequent opening of the circuit of the running winding.

3. A reversing system, as in claim 1, in which
said reversing switch has a switching element movable between two terminals of opposite polarity; and including
means connecting said switching element to one terminal of the operating coil of one relay and connecting the other terminal of said operating coil to said source of voltage to cause said relay switch to move to operated position only when the reversing switch switching element engages a predetermined one of its two terminals.

4. A reversing system, as in claim 3, in which
said means including said reversing switch functions to short-circuit the operating coils of said relay switch in operated position when said reversing switch switching element changes position to engage the second of its two terminals.

5. A reversing system as in claim 1, in which
said means including said reversing switch functions to energize the operating coils of one relay switch and to short-circuit the operating coil of the other relay switch.

References Cited by the Examiner

UNITED STATES PATENTS

| | | | |
|---|---|---|---|
| 2,380,270 | 7/1945 | Suhr et al. | 318—207 |
| 2,473,244 | 6/1949 | Fuller | 318—207 |
| 2,743,406 | 4/1956 | London | 318—207 |
| 2,804,582 | 8/1957 | Guth et al. | 318—207 |

ORIS L. RADER, *Primary Examiner.*

G. A. FRIEDBERG, *Assistant Examiner.*